(12) United States Patent
Yelton et al.

(10) Patent No.: US 11,636,151 B2
(45) Date of Patent: Apr. 25, 2023

(54) METHODS AND SYSTEMS FOR DISAMBIGUATING USER INPUT BASED ON DETECTION OF ENSEMBLES OF ITEMS

(71) Applicant: Rovi Guides, Inc., San Jose, CA (US)

(72) Inventors: Alexis Yelton, Somerville, MA (US); Xin Xu, Reading, MA (US); Shreyas Mahimkar, Quincy, MA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/884,445

(22) Filed: Aug. 9, 2022

(65) Prior Publication Data

US 2022/0391444 A1 Dec. 8, 2022

Related U.S. Application Data

(63) Continuation of application No. 17/531,928, filed on Nov. 22, 2021, now Pat. No. 11,449,546, which is a
(Continued)

(51) Int. Cl.
*G06F 16/78* (2019.01)
*H04N 21/45* (2011.01)
(Continued)

(52) U.S. Cl.
CPC ......... *G06F 16/7867* (2019.01); *G06F 16/58* (2019.01); *G06F 16/78* (2019.01);
(Continued)

(58) Field of Classification Search
CPC ......... H04N 21/4223; H04N 21/44008; H04N 21/44227; H04N 21/4524; H04N 21/4532;
(Continued)

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield et al. | |

(Continued)

OTHER PUBLICATIONS

Fujii et al., "Semantics-based context-aware dynamic service composition," ACM Transactions on Autonomous and Adaptive Systems (May 2009).
(Continued)

*Primary Examiner* — Nicholas T Corbo
(74) *Attorney, Agent, or Firm* — Haley Guiliano LLP

(57) ABSTRACT

Systems and methods are described for disambiguating user input based on a physical location of items in a vicinity of a user. The system determines that a query received from a user contains an ambiguity. In response, the system identifies several items in the physical vicinity of the user. Then, the system analyzes the identified plurality of items to determine whether the plurality of items forms a first ensemble of items or a second ensemble of items. If the plurality of items forms a first ensemble of items, the system performs a search using the search query and a first keyword related to the first ensemble of items. If the plurality of items forms a second ensemble of items, the system performs a search using the search query and a second keyword related to the second ensemble of items. The system then outputs results of the performed search.

20 Claims, 8 Drawing Sheets

Related U.S. Application Data continuation of application No. 17/201,669, filed on Mar. 15, 2021, now Pat. No. 11,210,340, which is a continuation of application No. 16/235,289, filed on Dec. 28, 2018, now Pat. No. 10,977,308, which is a continuation of application No. 15/949,650, filed on Apr. 10, 2018, now Pat. No. 10,204,160.

(51) Int. Cl.
  *H04N 21/482* (2011.01)
  *H04N 21/442* (2011.01)
  *H04N 21/44* (2011.01)
  *G06F 16/58* (2019.01)
  *H04N 21/4223* (2011.01)
  *H04N 21/47* (2011.01)
  *G06V 10/75* (2022.01)
  *G06V 20/00* (2022.01)

(52) U.S. Cl.
  CPC .......... *G06V 10/751* (2022.01); *G06V 20/00* (2022.01); *H04N 21/4223* (2013.01); *H04N 21/44008* (2013.01); *H04N 21/44227* (2013.01); *H04N 21/4524* (2013.01); *H04N 21/4532* (2013.01); *H04N 21/47* (2013.01); *H04N 21/482* (2013.01); *H04N 21/4828* (2013.01)

(58) Field of Classification Search
  CPC .. H04N 21/47; H04N 21/482; G06F 16/7867; G06F 16/58; G06F 16/78; G06V 10/751; G06V 20/00
  See application file for complete search history.

(56) References Cited

U.S. PATENT DOCUMENTS

| | | |
|---|---|---|
| 7,165,098 B1 | 1/2007 | Boyer et al. |
| 7,761,892 B2 | 7/2010 | Ellis et al. |
| 8,046,801 B2 | 10/2011 | Ellis et al. |
| 9,288,387 B1* | 3/2016 | Keller ................ H04N 21/4542 |
| 2002/0174430 A1 | 11/2002 | Ellis et al. |
| 2005/0251827 A1 | 11/2005 | Ellis et al. |
| 2010/0153885 A1 | 6/2010 | Yates |
| 2013/0024888 A1* | 1/2013 | Sivertsen .......... H04N 21/44008 725/35 |
| 2013/0036200 A1* | 2/2013 | Roberts ............... H04L 65/1093 709/219 |
| 2013/0067513 A1* | 3/2013 | Takami .............. G06Q 30/0241 725/34 |
| 2014/0188925 A1* | 7/2014 | Skolicki ............ G06F 16/24575 707/765 |
| 2014/0223467 A1* | 8/2014 | Hayton .............. H04N 21/4668 725/18 |
| 2014/0245335 A1* | 8/2014 | Holden ............ H04N 21/44218 725/12 |
| 2016/0323552 A1* | 11/2016 | Peterson ............ H04N 21/4223 |
| 2017/0358305 A1* | 12/2017 | Kudurshian ........ G10L 15/1815 |
| 2019/0208247 A1* | 7/2019 | Anguiano ........ H04N 21/44218 |
| 2020/0184963 A1* | 6/2020 | Joseph .................... G06F 3/167 |
| 2021/0081749 A1* | 3/2021 | Claire ................. G10L 15/1815 |

OTHER PUBLICATIONS

Kranz et al., "Embedded Interaction, Interacting with the Internet of Things," IEEE Internet Computing, 14(2): 8 pages (Mar.-Apr. 2010).

Matthews et al., "Augmenting collections of everyday objects: A case study of clothes hangers as an information display," International Conference on Pervasive Computing, Pervasive Computing, pp. 340-344 (2004) (5 pages).

Roggen et al., "Opportunistic human activity and context recognition," Computer, 46(2) Feb. 2013 (10 pages).

\* cited by examiner

METHODS AND SYSTEMS FOR DISAMBIGUATING USER INPUT BASED ON DETECTION OF ENSEMBLES OF ITEMS

CROSS-REFERENCE TO RELATED APPLICATIONS

This application is a continuation of U.S. patent application Ser. No. 17/531,928, filed Nov. 22, 2021, which is a continuation of U.S. patent application Ser. No. 17/201,669, filed Mar. 15, 2021 (now U.S. Pat. No. 11,210,340), which is a continuation of U.S. patent application Ser. No. 16/235,289, filed Dec. 28, 2018 (now U.S. Pat. No. 10,977,308), which is a continuation of U.S. patent application Ser. No. 15/949,650, filed Apr. 10, 2018 (now U.S. Pat. No. 10,204,160), which are hereby incorporated by reference herein in their entireties.

BACKGROUND

Modern computer systems often seek to provide results in response to users' search queries. For example, Internet search engines commonly return results in response to receiving a user's text query. In addition, modern user devices often attempt to perform actions requested via a user's voice input. A common problem encountered by such systems is that the user's search query may contain portions that are ambiguous or unclear. Modern computer systems perform a variety of disambiguation techniques. For example, user profile data may be used to attempt disambiguation. However, modern computer systems still lack an ability to perform disambiguation based on the state of the real-time physical environment of the user. Consequently, such computer search systems often deliver search results or perform actions that are inappropriate for the user's current physical environment. Such inappropriate results may force the user to refine or totally replace the search. In some cases, a user may even give up on the search altogether. Consequently, the inability to account for the state of a physical environment amounts to poor performance in such a computerized search system.

SUMMARY

Accordingly, to overcome these challenges, a media guidance application may use one or more sensors to analyze the physical environment of the user. For example, the media guidance application may be a part of an Internet of Things (IoT) network and use the IoT protocols to identify a set of items that are located in the physical vicinity of the user. In another example, the media guidance application may use any other sensor to identify the set of items. For example, the media guidance application may use a video sensor, infrared (IR) sensor, near field communication (NFC) sensor, heat sensor, any other sensor or any combination thereof.

In some embodiments, the media guidance application may determine that the set of items that are located in the physical vicinity of the user form a certain arrangement or ensemble of items. For example, the media guidance application may determine what kind of an outfit the user is wearing, where an outfit may be an ensemble of clothing items. For example, the media guidance application may determine that the user is wearing a work outfit (e.g., an ensemble including work pants, dress shoes, and a long-sleeved shirt) or a gym outfit (e.g., an ensemble including gym shorts, athletic shoes, and headband).

In some embodiments, the media guidance application may use a keyword associated with the determined ensemble to disambiguate the search query received from the user. For example, the media guidance application may add such a keyword to the search query, select appropriate search tabs, or filter the possible results. For example, the user may input a query "Call John." The media guidance application may search the user's contact list and determine that more than one John is present, and thus that the term "John" is ambiguous. In some embodiments, the media guidance application may then identify that that a "work outfit" ensemble of items is present in the vicinity of the user (e.g., the user is wearing a work outfit). The media guidance application may then add the "work" keyword to the user's query. In this case, "Call John (work)" may return a single result, allowing the media guidance application to complete the search and place a call to the correct recipient.

Accordingly, the techniques disclosed herein significantly improve operations of computerized search systems by allowing such systems to provide more precise results in response to receiving an ambiguous search by leveraging the ability to identify ensembles of items present in the physical vicinity of the user. In particular, while other systems may be return inappropriate results that do not match the environment of the user, the presently described system is able to return results relevant to the situation.

In some embodiments, the media guidance application may receive a search query from the user. For example, the media guidance application may receive a query "Call John," via text input or via voice input. In some embodiments, the media guidance application may then determine that the search query contains an ambiguity. For example, the media guidance application may determine that the user's contact list includes more than John (e.g., a coworker John Boss and gym partner John Racquet).

In some embodiments, the media guidance application may perform several actions in response to determining that the search query contains an ambiguity. In some embodiments, the media guidance application may identify, using at least one sensor, a plurality of items in the physical vicinity of the user. For example, the media guidance application may identify all articles of clothing worn by the user using IoT identification. In another example, each article of clothing may include an RFID tag which may be read by the media guidance application to identify each article of clothing.

In some embodiments, the media guidance application may determine that the plurality of items forms a first ensemble of items (e.g., a business outfit). In this case, the media guidance application may perform a search using the search query and a first keyword related to the first ensemble of items. For example, the media guidance application may perform a search using terms "Call John" and "work." In some embodiments, this search may return a single result "John Boss."

In some embodiments, the media guidance application may determine that the plurality of items forms a second ensemble of items (e.g., a gym outfit). In this case, the media guidance application may perform a search using the search query and a second keyword related to the second ensemble of items. For example, the media guidance application may perform a search using terms "Call John" and "gym." In some embodiments, this search may return the result "John Racquet."

In some embodiments, the media guidance application may output a result of the performed search. For example, the result may be displayed on a screen or reproduced as sound. In some embodiments, an action may be taken by the media guidance application based on the search query. For example, the media guidance application may output a line "Calling John Boss" or "Calling John Racquet." In some embodiments, the media guidance application may also place the call to John Boss or to John Racquet.

In some embodiments, the media guidance application may access a list of ensemble templates, each ensemble template identifying a plurality of physical items and a descriptive keyword. In some embodiments, the list of ensemble templates may be stored in a local storage or accessed from a remote server. For example, one template may include keywords "Work Outfit" and identify a plurality of clothing items including, for example, "a long-sleeved shirt," a "tie," and "dress shoes." Another template may include keywords "Gym Outfit" and identify a plurality of clothing items including for example, "tank top," "athletic shoes," and "headband."

In some embodiments, the media guidance application may receive a search query from the user. For example, the media guidance application may receive text or voice input from the user via a user interface. For example, the media guidance application may receive a query "Call John," via text input or via voice input.

In some embodiments, the media guidance application may determine that the search query received from the user comprises a portion with multiple possible meanings. For example, the media guidance application may perform linguistic analysis on every word or combination of words in the search query to determine if the word or combination of words has multiple meanings. In some embodiments, every word or combination of words may be matched against a set of possible results, and if more than one possible result is returned, the media guidance application may determine that the search query received from the user comprises a portion with multiple possible meanings.

For example, if the search query is "Call John," the media guidance application may determine that the set of possible results is the entries from the user's contact list. In some embodiments, the media guidance application may then match "John" against every entry in the contact list. In one example, the media guidance application may determine that the user's contact list has two entries that match the word "John": "John Boss" (the user's coworker) and "John Racquet" (the user's gym partner). In this case, since more than one possible result is returned, the media guidance application may determine that the term "John" has multiple possible meanings.

In some embodiments, the media guidance application may perform as series of steps in response to determining that the search query comprises the portion with multiple possible meanings. In some embodiments, the media guidance application may detect, using a sensor, a set of items in a physical vicinity of the user. For example, the media guidance application may use an RFID reader to create set of items that would include all articles of clothing worn by a user. In some embodiments, each article of clothing worn by a user may include an RFID tag that can be scanned by the RFID reader to identify that article of clothing, and cause the media guidance application to add that article of clothing to the set of items in a physical vicinity of the user.

In some embodiments, the media guidance application may detect the set of items in the physical vicinity of the user by performing a series of steps described below. In some embodiments, the media guidance application may identify a first item and a second item (e.g., by using a sensor). In some embodiments, the media guidance application may then calculate a distance between the first item (e.g., a tie) and the second item (e.g., a shirt). For example, the distance may be determined to be 1 meter. In some embodiments, the media guidance application may determine whether the distance corresponds to (e.g., is below) a vicinity threshold (e.g., 2 meters). In some embodiments, in response to determining that the distance corresponds to the vicinity threshold (e.g., it's under the threshold), the media guidance application may add the first item and the second item to the set of items. For example, since 1 meter is below the threshold of 2 meters, the tie and shirt may be added to the set of items. In some embodiments, this is done because items being located near each other presents a strong likelihood of the items forming an ensemble of items (e.g., an outfit).

In some embodiments, the media guidance application may determine whether the set of items matches a plurality of physical items identified by the first ensemble template of the list of ensemble templates. For example, the first template may include keywords "Work Outfit" and identify a plurality of clothing items, including for example, "a long-sleeved shirt," a "tie," and "dress shoes." In this example, the set of items may include a dress shirt and black leather shoes worn by the user. In this example, since the dress shirt of the set matches "long-sleeved shirt" of the first template and since black leather shoes match the "dress shoes" of the first template, the media guidance application may determine that the set of items matches a plurality of physical items identified by the first ensemble template.

In some embodiments, in response to determining that there is a match, the media guidance application may add a descriptive keyword identified by the first ensemble template to the search query received from the user to generate a modified search query. For example, the media guidance application may add the keyword "work" identified by the first template to the search query Call John," resulting a modified search query "Call John (work)." In some embodiments, the media guidance application may then perform a search based on the modified search query. For example, the media guidance application may search the user's contact list for people named "John" and associated with the user's work. In some embodiments, the media guidance application may then generate for display the results of the performed search. For example, the media guidance application may display the words "Calling John Boss" on the screen of the user's device. In another example, the media guidance application may generate an audio output "Calling John Boss." In some embodiments, the media guidance application may also call John Boss.

In some embodiments, the media guidance application may further modify the search query. For example, the media guidance application may determine whether the set of items matches a plurality of physical items identified by a second ensemble template of the list of ensemble templates. For example, the set of items in the vicinity of the user may include a gym outfit, including sneakers and a tank top. In some embodiments, the media guidance application may determine that this matches a second plurality of physical items identified by a second ensemble template which identifies keyword "gym outfit" and identifies a plurality of items including "athletic shoes," "sports top," "sports shorts." For example, the media guidance application may add the keyword "gym" identified by the first template to the search query "Call John," resulting in a modified search query "Call John, gym."

In some embodiments, the media guidance application may determine whether the set of items matches the plurality of physical items identified by the first ensemble template by performing series of steps described below. In some embodiments, the media guidance application may calculate the number of items of the set of items that match at least one item of the plurality of physical items identified by the first ensemble template. For example, the media guidance application may determine that three items of the set of items match the plurality of physical items identified by the first ensemble template (e.g., the shoes, the shirt, and the pants). In some embodiments, the media guidance application may determine that the number exceeds a match threshold (e.g., 2 items). In some embodiments, the media guidance application may then determine that the set of items matches the plurality of physical items of the first ensemble template.

In some embodiments, the set of items comprises a first plurality of clothing items worn by the user. In some embodiments, the media guidance application may, in response to determining that the set of items matches the plurality of physical items identified by the first ensemble template of the list of ensemble templates, add a dress code keyword to the search query received from the user to generate the modified search query. For example, the media guidance application may modify the search by adding terms such as "work," "gym," "black tie," or any other attire keyword.

In some embodiments, the set of items comprises a first plurality of furniture items. In some embodiments, the media guidance application may then add a furniture arrangement keyword to the search query received from the user to generate the modified search query. In some embodiments, the media guidance application may then, in response to determining that the set of items matches the plurality of physical items identified by the first ensemble template of the list of ensemble templates, add a furniture arrangement keyword to the search query received from the user to generate the modified search query. For example, the media guidance application may modify the search by adding terms such as "party," "dinner," "relaxation", etc. For example, the media guidance application may differentiate between furniture arranged for a party and furniture arranged for relaxation.

In some embodiments, the set of items comprises a first plurality of food items. In some embodiments, the media guidance application may then add a recipe keyword to the search query received from the user to generate the modified search query. In some embodiments, the media guidance application may then, in response to determining that the set of items matches the plurality of physical items identified by the first ensemble template of the list of ensemble templates, add a recipe keyword to the search query received from the user to generate the modified search query. For example, the media guidance application may modify the search by adding terms such as "pizza," "omelet," "bread," etc. For example, the media guidance application may differentiate between different food items arranged in the physical vicinity of the user.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
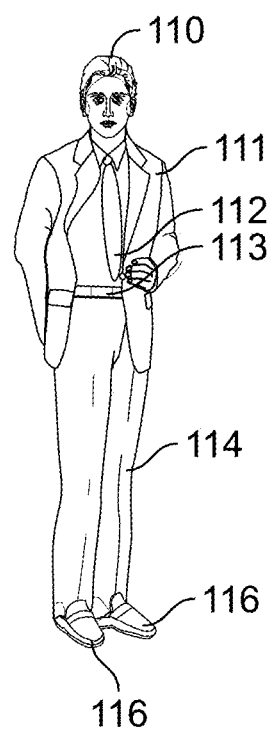
FIG. 1A shows an illustrative block diagram of a system for responding to user's queries, in accordance with some embodiments of the disclosure.
Figure 1A:
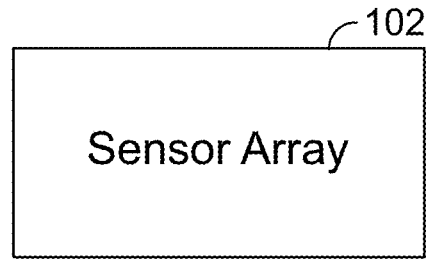
Figure 1A:

In some embodiments, the media guidance application may receive user queries or input (e.g. via text or via voice input). The media guidance application may then determine that the input has an ambiguous portion that prevents a single interpretation. In response, the media guidance application may use one or more sensors to identify a set of items in the physical vicinity of the user.

Further, the media guidance application may determine that the set of items matches a particular ensemble of items (e.g., an outfit, furniture configuration, etc.). Then, the media guidance application may modify the input (e.g., by adding a keyword associated with the matching ensemble of items.) Then, the media guidance application may return an output or perform an action based on the modified input. In this way, the media guidance application significantly improves a capability of a computerized search system (e.g., a digital personal assistant) to react to ambiguous input. Where previous systems would be unable to provide an output without additional user input, the media guidance application may leverage information about ensemble of items being present in the vicinity of the user to disambiguate the user's input and provide an appropriate response.

As referred to herein, any of the terms "ensemble of items" or "item ensemble" or "ensemble" may refers to any kind of a set or arrangement of items which are located near each other in a physical space and are related to each other. For example, an ensemble may be several articles of clothing intended to be worn together. In another example, an ensemble may be a several pieces of furniture arranged for a particular purpose (e.g., for a party.). In another example, an ensemble may be a several food items intended to be used as a part of the same recipe.

As referred to herein, the term "ensemble template" may refer to any kind of table, database, or any other data structure that identifies a plurality of items typical of a certain ensemble of items. In some embodiments, the ensemble template may also include one or more keywords associated with that ensemble of items. For example, an ensemble template may identify articles of clothing which are typical of a business outfit (e.g., tie, dress shoes, belt, etc.). In some embodiments, such an ensemble template may identify keywords such as "work," "business," etc.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application. In some embodiments, the interactive media guidance application may include an off-chain oracle. In some embodiments, the off-chain oracle may be used by any device accessing the blockchain to access data related to the blockchain but stored separately from the blockchain.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

FIG. 1A shows an illustrative block diagram of a system 100 for responding to user's queries, in accordance with various embodiments of the disclosure. In some embodiments, the system may include user device 104 and, optionally, a sensor array 102. In some embodiments, sensor array 102 may be fully or partially built into device 104. In some embodiments, user device 104 may be located in a physical vicinity of user 110. In some embodiments, the user may be dressed in a business suit, which includes jacket 111, tie 112, belt 113, dress pants 114, and dress shoes 116.

In some embodiments, the media guidance application may receive an input from user 110. For example, user 110 may provide an input via user device 104 via text or voice input. In some embodiments, the input may comprise a search query. For example, user 110 may provide an input "Call John."

In some embodiments, the media guidance application may determine that the search query received from the user comprises a portion with multiple possible meanings. For example, the media guidance application may determine that user 110 has two Johns in his contact list (e.g., a coworker John Boss and a gym partner John Racquet).

In some embodiments, in response to detecting an ambiguity, the media guidance application may detect, e.g., using sensor array 102, a set of items in a physical vicinity of the user. In some embodiments, the media guidance application may determine the set of items using IoT protocols. For example, each item 111-116 may be an IoT-enabled item that can identify itself over a network. In some embodiments, each item 111-116 may have an RFID tag that, when scanned, may be able to provide identifying information to user device 104. In some embodiments, the media guidance application may use sensor array 102 to identify items 111-116. For example, sensor array 102 may use a video camera to identify items 111-116 using video processing algorithms. In some embodiments, sensor array 102 may use a video sensor, an IR sensor, an NFC sensor, a heat sensor, any other sensor or any combination thereof to identify items 111-116.

In some embodiments, once the set of items is identified, the media guidance application may determine whether the set of items matches a plurality of physical items identified by a first ensemble template. For example, the media guidance application may access the first ensemble template represented by Table 1:

TABLE 1

| Attribute | Value |
| --- | --- |
| Keyword 1 | Business |
| Keyword 2 | Work |
| Keyword 3 | Outfit |
| Item 1 | Long-sleeved Shirt |
| Item 2 | Long Pants |
| Item 3 | Dress Shoes |
| Item 4 | Tie |
| Item 5 | Belt |
| Item 6 | Suspenders |
| Item 7 | Jacket |
| Item 8 | Cufflinks |
| Item 9 | Vest |

In some embodiments, the first ensemble template may identify keywords, such as "Business" and "Work," and identify a plurality of items (e.g., "Tie," "Long-sleeved Shirt"). In some embodiments, the media guidance application may determine that the set of items in the vicinity of the user matches the threshold number of items (e.g., three items) identified by the first ensemble template. For example, shoes 116 may match item 3 of Table 1, jacket 111 may match item 7 of Table 1, and belt 113 may match item 5 of Table 1.

In some embodiments, the media guidance application may then add at least one keyword identified by the first template to the user's input. For example, the media guidance application may add keyword 2 of Table 1 (i.e., the keyword "work") to the user's input to create a modified user's input "Call John, work."

In some embodiments, the media guidance application may then perform a search based on the modified search query and generate for display results of the performed search. For example, the result may be displayed on a screen of user device 104. For example, user device 104 may display text "Calling John Boss."

Figure 1B:
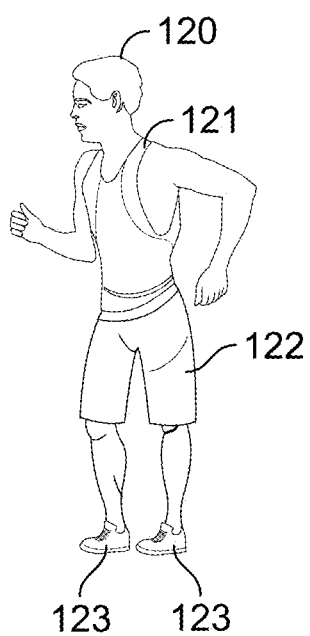
FIG. 1B shows another illustrative block diagram of a system for responding to user's queries, in accordance with some embodiments of the disclosure.
Figure 1B:
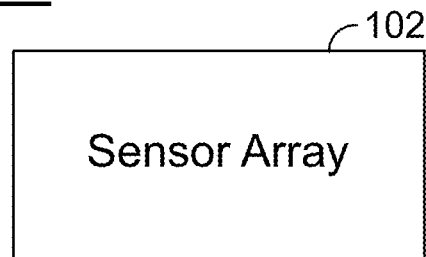
Figure 1B:

FIG. 1B shows another illustrative block diagram of a system 100 for responding to user's queries, in accordance with various embodiments of the disclosure. In some embodiments, the system may include user device 104 and sensor array 102. In some embodiments, sensor array 102 may be fully or partially built into device 104. In some embodiments, user device 104 may be located in a physical vicinity of user 120. In some embodiments, the user 120 may be the same person as user 110. In some embodiments, the user may be dressed in gym outfit, which includes tank top 121, shorts 122, and sneakers 123.

In some embodiments, user 120 may also provide an input "Call John." In this example, the media guidance application may similarly determine that user 110 has two Johns in his contact list (e.g., a coworker John Boss and a gym partner John Racquet). In some embodiments, in response to detecting an ambiguity, the media guidance application may detect, e.g., using sensor array 102, a set of items (e.g., items 121-123) in a physical vicinity of the user.

In some embodiments, once the set of items is identified, the media guidance application may determine whether the set of items matches a plurality of physical items identified by a second ensemble template. For example, the media guidance application may access the second ensemble template represented by Table 2:

TABLE 2

| Attribute | Value |
| --- | --- |
| Keyword 1 | Gym |
| Keyword 2 | Sports |
| Keyword 3 | Outfit |
| Item 1 | Athletic Shoes |
| Item 2 | Shorts |
| Item 3 | Sweat Pants |
| Item 4 | Headband |
| Item 5 | Water Bottle |
| Item 6 | Sports Bra |
| Item 7 | Athletic Top |

In some embodiments, the first ensemble template may identify keywords, such as "Gym" and "Sports," and identify a plurality of items (e.g., "Athletic Shoes," "Headband"). In some embodiments, the media guidance application may determine that the set of items in the vicinity of the user matches the threshold number of items (e.g., three items) identified by the first ensemble template. For example, tank top 121 may match item 7 of Table 2, shorts 122 may match item 2 of Table 2, and sneakers 123 may match item 1 of Table 2.

In some embodiments, the media guidance application may then add at least one keyword identified by the second template to the user's input. For example, the media guidance application may add keyword 1 of Table 2 (i.e., the keyword "gym") to the user's input to create a modified user's input "Call John gym."

In some embodiments, the media guidance application may then perform a search based on the modified search query and generating for display the results of the performed search. For example, the result may be displayed on a screen of user device 104. For example, user device 104 may display text "Calling John Racquet."

In some embodiments, the media guidance application may receive a search query "What am I forgetting?" In this case, the media guidance application may identify a set of items worn by the user (e.g., shorts, tank top and shoes). Then, the media guidance application may determine that the second ensemble template matches the set of items worn by the user, but contains additional items (e.g., headband) not worn by the user. In this example, the media guidance application may output the term "headband" as an answer to the query "What am I forgetting?"

Figure 2:
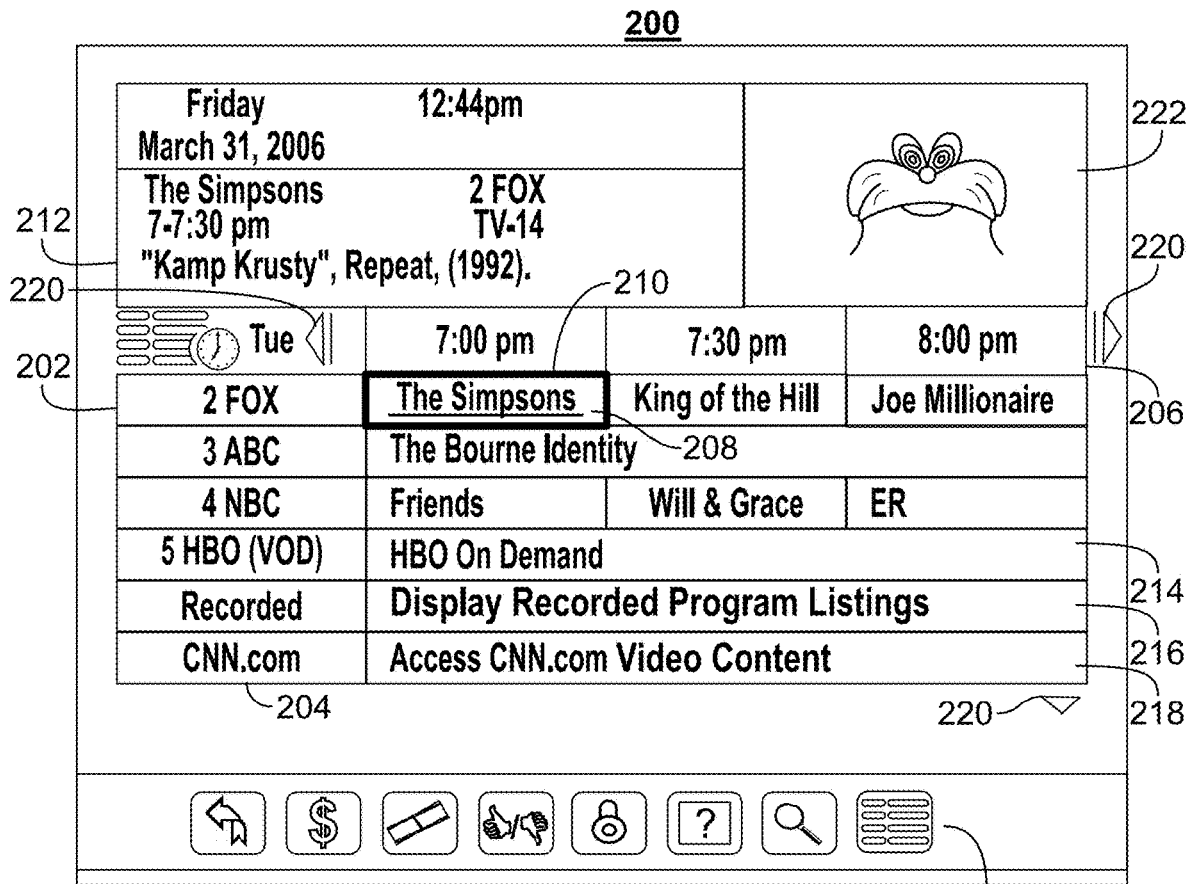
FIG. 2 shows an illustrative media guidance interface that may dynamically include or exclude a video, in accordance with some embodiments of the disclosure.
Figure 3:
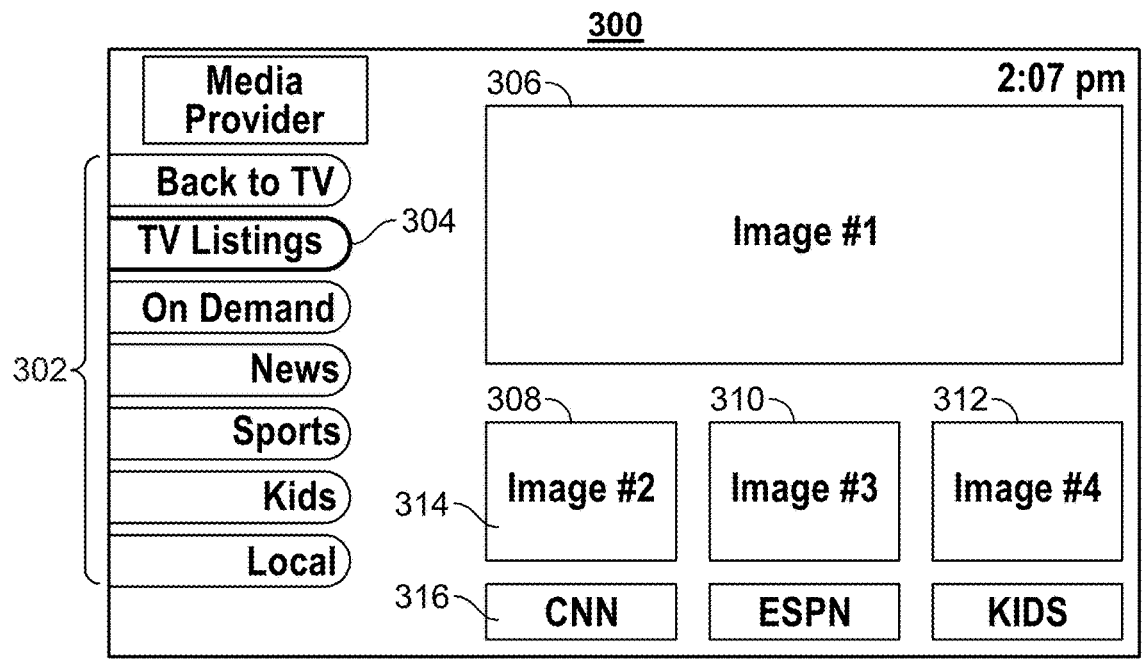
FIG. 3 shows another illustrative media guidance interface that may dynamically include or exclude a video, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
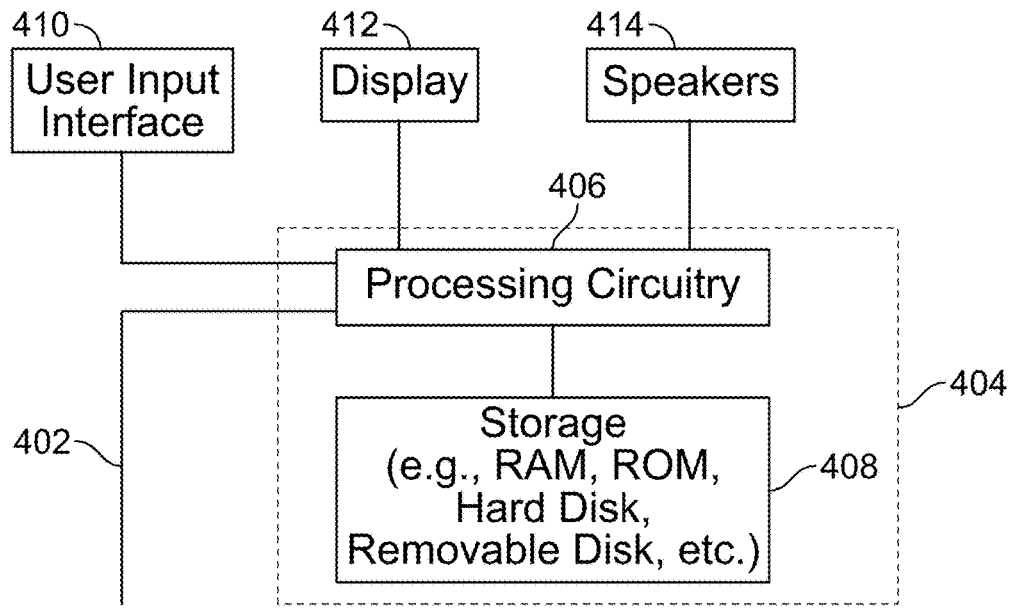
FIG. 4 is a block diagram of an illustrative user equipment device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
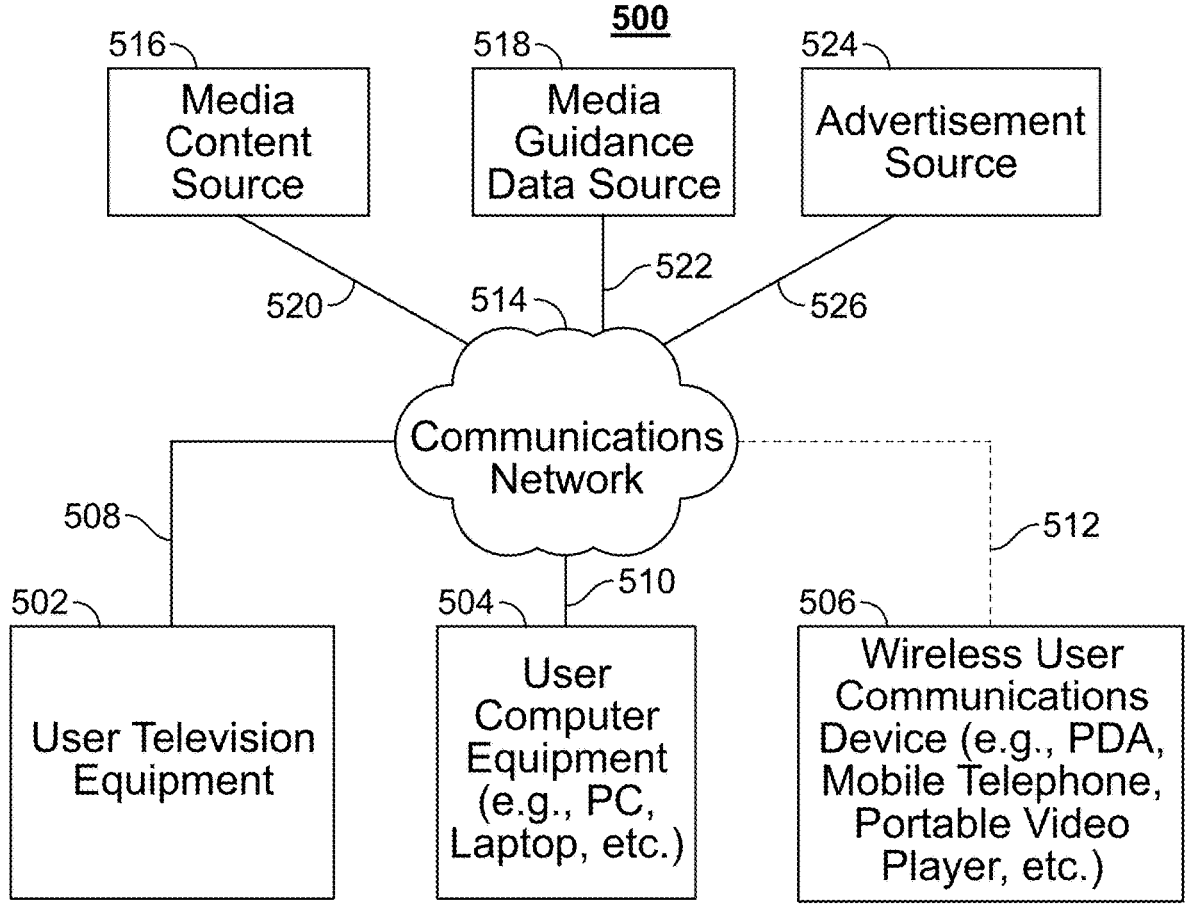
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 524 may be configured to maintain user information including advertisement-suitability scores associated with user in order to provide targeted advertising. Additionally or alternatively, a server associated with advertisement source 524 may be configured to store raw information that may be used to derive advertisement-suitability scores. In some embodiments, advertisement source 524 may transmit a request to another device for the raw information and calculate the advertisement-suitability scores. Advertisement source 524 may update advertisement-suitability scores for specific users (e.g., first subset, second subset, or third subset of users) and transmit an advertisement of the target product to appropriate users.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Detailed descriptions of FIGS. 6-12 are provided below. It should be noted that processes 600-1200, or any step thereof, could be performed on, or provided by, any of the devices shown in, or described with respect to, FIGS. 4-5. For example, either process 600 or process 700 may be executed by control circuitry 404 (FIG. 4) as instructed by media guidance application(s) implemented on user equipment 502, 504, and/or 506 (FIG. 5). In addition, one or more steps of processes 600 and 700 may be incorporated into, or combined with, one or more steps of any other process or embodiment.

Figure 6:
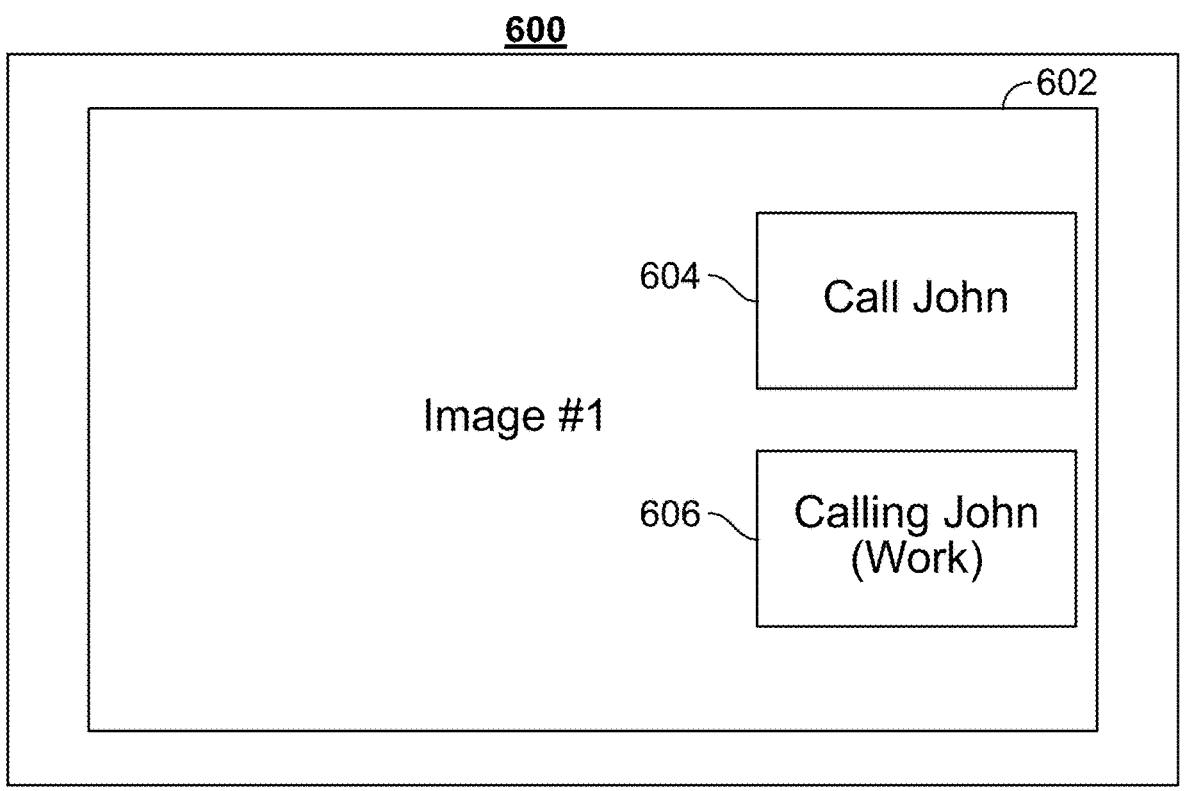
FIG. 6 shows yet another illustrative media guidance interface that may dynamically include or exclude a video, in accordance with some embodiments of the disclosure.

FIG. 6 shows an illustrative media guidance interface that may dynamically include or exclude a video, in accordance with various embodiments of the disclosure. In some embodiments, display 600 may display a media asset provided by the media guidance application. For example, display 600 may display image 602. Image 602 may be a part of the media asset provided by the media guidance application. In some embodiments, display 600 may be used to receive and/or display search queries received from a user as well as replies or results generated by the media guidance application.

In some embodiments, while the media asset is delivered to display 600 (or at any other time), the media guidance application may receive a query from a user. For example, query 604 (e.g., "Call John") may be received from a user. In some embodiments, query 604 may then be displayed in screen 600 overlaid over picture 602. In some embodiments, the media guidance application may disambiguate query 604 in respond to determining that the term "John" may refer to more than one person. In some embodiments, the media guidance application may use a sensor to determine that the user (e.g., user 110) is wearing a tie, a jacket and dress shoes (e.g., items 112, 111, and 116).

In some embodiments, the media guidance application may then determine that the set of items worn by the user matches a certain ensemble template of a set of ensemble templates that define various possible outfits. For example, a set of items worn by the user may match Table 1. In this example, the media guidance application may add a keyword of the ensemble template (e.g., Table 1) to the user's query 604. For example, the media guidance application may add the keyword "work" to the user's query to create a modified query (e.g., "Call John (work"). In some embodiments, the media guidance application may then perform a search using the modified query and determine that a contact "John (work)" should be called. In some embodiments, the media guidance application may output the result of a search to screen 600. For example, the media guidance application may display result 606 with text "Calling John (work.)." In some embodiments, the media guidance application may also actually place a call to a phone number associated with John (work).

Figure 7:
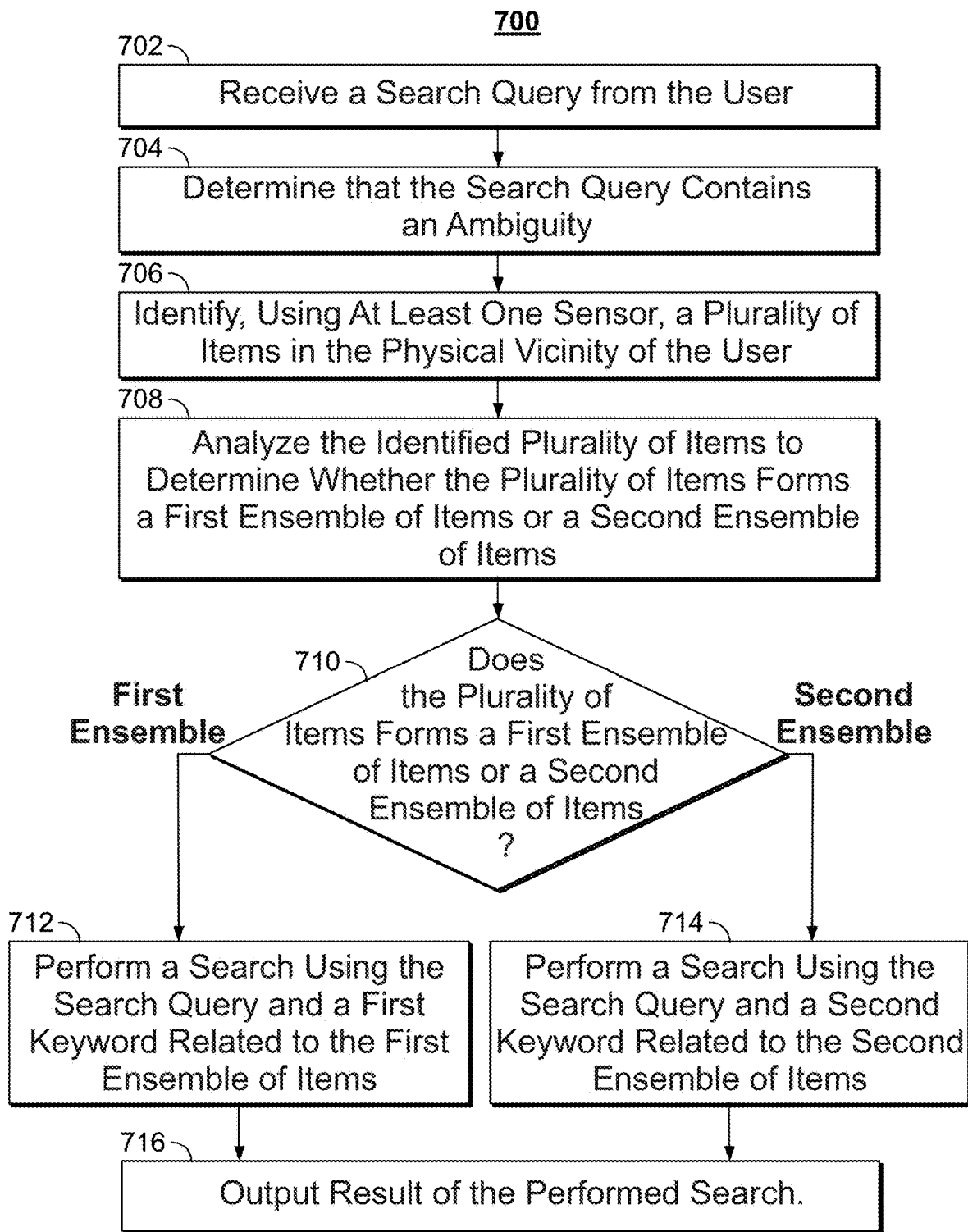
FIG. 7 depicts an illustrative flow diagram for a process of disambiguating user input, in accordance with some embodiments of the disclosure.

FIG. 7 depicts an illustrative flow diagram of a process 700 for a process of disambiguating user input in accordance with an embodiment of the disclosure. Process 700 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514.

Process 700 begins at 702, where control circuitry 404 may receive a search query from the user. For example, control circuitry 404 may receive user input as a text command or as a voice command via user device 104. For example, control circuitry 404 may receive input "Show me the recipe."

Process 700 continues at 704 where control circuitry 404 may determine that the search query contains an ambiguity. For example, control circuitry 404 may determine that word "recipe" is ambiguous because it is unclear what kind of recipe the user looking for (e.g., a cake recipe or hamburger recipe). In response to such a determination, control circuitry 404 may perform steps 706-716.

Process 700 continues at 706 where control circuitry 404 may identify, using at least one sensor (e.g., an IoT sensor, RFID sensor, or video sensor), a plurality of items in the physical vicinity of the user. For example, control circuitry 404 may identify a set of food ingredients arranged in the vicinity of the user.

Process 700 continues at 708 where control circuitry 404 may analyze the identified plurality of items to determine whether the plurality of items forms a first ensemble of items or a second ensemble of items. In one example, the set of food ingredients arranged in the vicinity of the user may include eggs, ham, milk and cheese. In this example, control circuitry 404 may determine that the plurality of items forms a first (e.g., ensemble "omelet"). In another example, the set of food ingredients arranged in the vicinity of the user may include eggs, flour, milk and baking soda. In this example, control circuitry 404 may determine that the plurality of items forms a second ensemble (e.g., ensemble "pancakes").

Process 700 continues at 710 where control circuitry 404 may proceed differently based on where the plurality of items forms a first ensemble of items (e.g., ensemble "omelet") or a second ensemble of items (ensemble "pancakes"). If the plurality of items forms a first ensemble of items, process 700 may proceed to 712. If the plurality of items forms a second ensemble of items, process 700 may proceed to 714.

At 712, control circuitry 404 may perform a search using the search query and a first keyword related to the first ensemble of items. For example, control circuitry 404 may search a database (e.g., an Internet search database) using keywords "recipe" and "omelet."

At 714, control circuitry 404 may perform a search using the search query and a second keyword related to the second ensemble of items. For example, control circuitry 404 may search a database (e.g., an Internet search database) using keywords "recipe" and "pancakes."

Process 700 continues at 710 where control circuitry 404 may output the result of the performed search (e.g., at one of steps 712 and 714). For example, control circuitry 404 may display an omelet recipe or pancakes recipe retrieved via a search of the Internet database.

Figure 8:
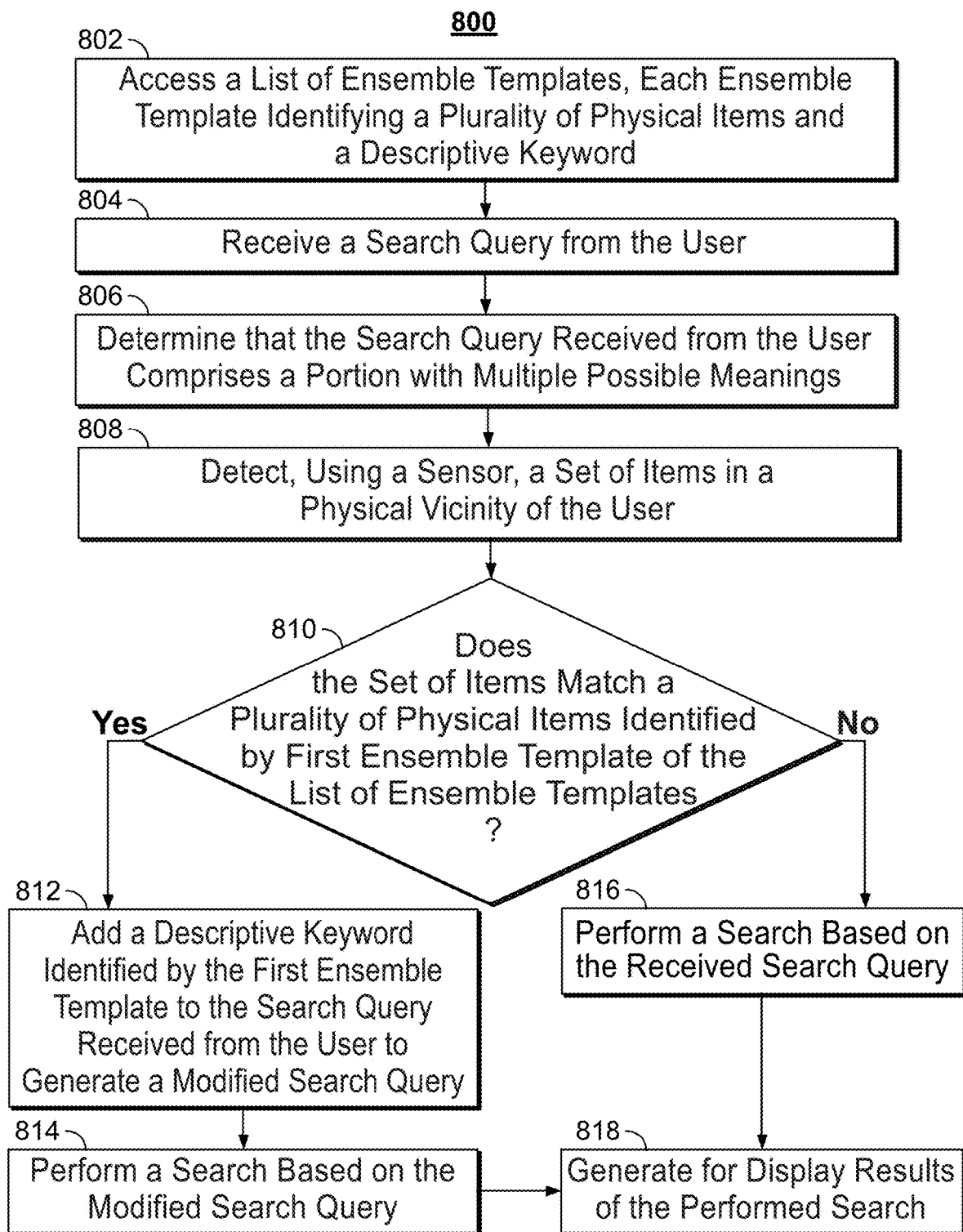
FIG. 8 depicts another illustrative flow diagram for a process of disambiguating user input, in accordance with some embodiments of the disclosure.

FIG. 8 depicts another illustrative flow diagram of a process 800 for disambiguating user input in accordance with an embodiment of the disclosure. Process 800 may be executed by control circuitry 404 (e.g., in a manner instructed to control circuitry 404 by the media guidance application). Control circuitry 404 may be a part of the user equipment (e.g., user television equipment 502, user computer equipment 504, and/or wireless communications device 506), or of a remote server separated from the user equipment by way of communications network 514.

Process 800 begins at 802, where control circuitry 404 accesses a list of ensemble templates, each ensemble template identifying a plurality of physical items and a descriptive keyword. In some embodiments, control circuitry 404 may locally store the list of ensemble templates (e.g., at storage 408). In some embodiments, control circuitry 404 may remotely access the list of ensemble templates (e.g., from media guidance data source 518). In some embodiments, control circuitry 404 may include ensemble templates depicted by Table 1 and Table 2 above, and other ensemble templates.

Process 800 continues at 804, where control circuitry 404 may receive a search query from the user. For example, control circuitry 404 may receive user input as a text command or as a voice command via user device 104. For example, control circuitry 404 may receive input "Call John."

Process 800 continues at 806, where control circuitry 404 may determine that the search query received from the user comprises a portion with multiple possible meanings. For example, control circuitry 404 may determine that the search query "Call John" received from the user comprises a portion with multiple possible meanings. For example, the word "John" may potentially refer to multiple people (e.g., to "John (work)" and to "John (gym)"). In response to such a determination, control circuitry 404 may perform steps 808-818.

Process 800 continues at 808, where control circuitry 404 may detect, using a sensor, a set of items in a physical vicinity of the user. For example, control circuitry 404 may determine that the user (e.g., user 120) is wearing several items indicative of a gym outfit. For example, control circuitry 404 may use a video sensor (or any other sensor) to identify the items tank top 121, shorts 122, and sneakers 123.

Process 800 continues at 810, where control circuitry 404 may determine whether the set of items matches a plurality of physical items identified by the first ensemble template of the list of ensemble templates (e.g. a template defined by Table 2). For example, control circuitry 404 may determine that since tank top 121, shorts 122 and sneakers 123 all match at least one keyword identified by the first ensemble template, there is a match between the set of items and the plurality of physical items identified by the first ensemble template. In some embodiments, if the match is established, process 800 may proceed to 812. In some embodiments, if the match is not established, process 800 may proceed to 816.

At 812, control circuitry 404 may add a descriptive keyword identified by the first ensemble template to the search query received from the user to generate a modified search query. For example, if the first ensemble template is the ensemble template depicted by Table 2, control circuitry 404 may add keyword "gym" (i.e., keyword 1 of Table 2) to the search query received from the user to generate a modified search query "Call John gym."

At 814, control circuitry 404 may perform a search based on the modified search query. For example, control circuitry 404 may search the user's contact list using terms "John gym." In some embodiments, this may identify a unique contact. In some embodiments, control circuitry 404 may generate an output "calling John (gym)" (e.g., output 606).

At 816, control circuitry 404 may perform a search based on the unmodified search query. For example, control circuitry 404 may search the user's contact list using term "John." In some embodiments, since the there is more than one John in the contact list, control circuitry 404 may generate an output "Do you mean John (work) or John (gym)?"

Process 800 continues at 818, where control circuitry 404 may generate for display results of the performed search. In one example, control circuitry 404 may display the words "Calling John (gym)" (at which point control circuitry 404 may place a call to John (gym)). In another example, control circuitry 404 may generate text "Do you mean John (work) or John (gym)?" In this case, further input may be needed in order for the call to be placed.

Figure 9:
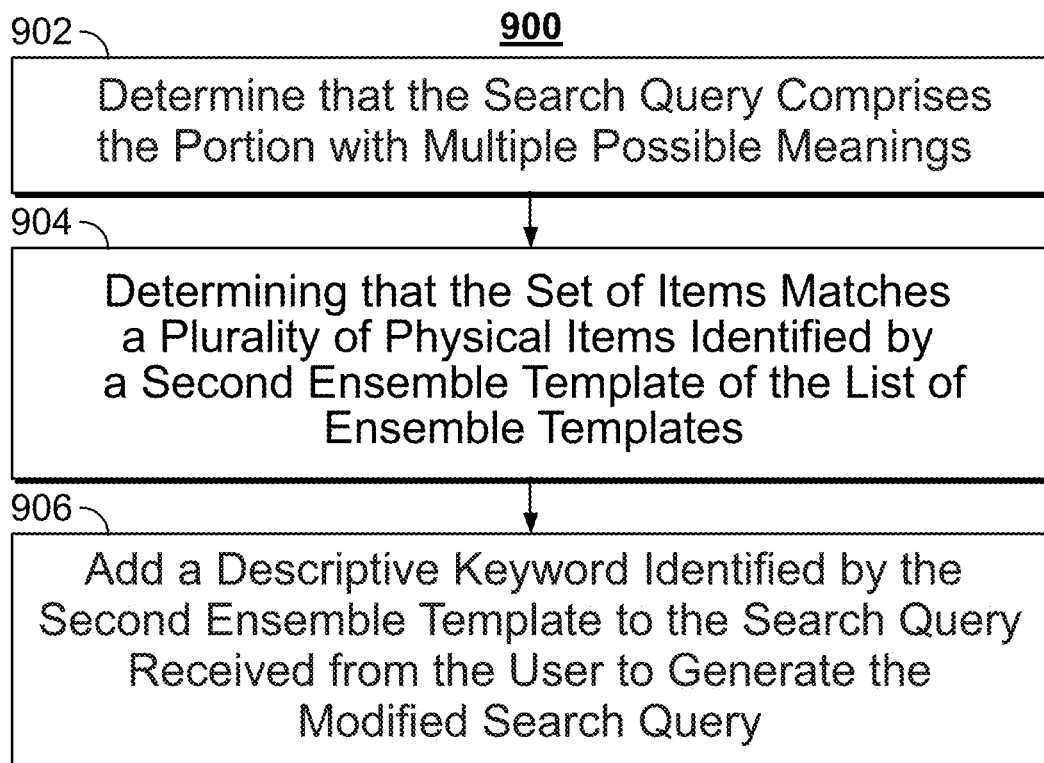
FIG. 9 depicts yet another illustrative flow diagram for a process of disambiguating user input, in accordance with some embodiments of the disclosure.

FIG. 9 depicts another illustrative flow diagram of a process 900 for a process of disambiguating user input in accordance with an embodiment of the disclosure. Process 900 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514. In some embodiments, process 900 occurs after step 812 of FIG. 8. For example, control circuitry 404 may perform steps 810-812 multiple times to add several keywords to the search query.

Process 900 begins at 902, where control circuitry may determine that the search query received from the user comprises a portion with multiple possible meanings. In some embodiments, step 902 maybe be performed in the same manner as step 806 of FIG. 8. In response to detecting the ambiguity, control circuitry 404 may proceed to step 904.

Process 900 continues at 904, where control circuitry determines that the set of items matches a plurality of physical items identified by a second ensemble template of the list of ensemble templates. For example, the second ensemble template may define a tennis outfit. For example, second ensemble template may be represented by Table 3:

TABLE 3

| Attribute | Value |
| --- | --- |
| Keyword 1 | Tennis |
| Keyword 2 | Outfit |
| Item 1 | Racquet |
| Item 2 | Tennis ball |
| Item 3 | Tennis hat |

For example, the set of items (e.g., as identified in step 808) may include: a tennis racquet and a tennis ball in the vicinity of the user (e.g., user 120). In this example, control circuitry 404 may determine that since the tennis racquet and a tennis ball match at least one keyword identified by the first ensemble template, there is a match between the set of items and the plurality of physical items identified by the second ensemble template.

At 906, control circuitry 404 may add a descriptive keyword identified by the second ensemble template to the search query received from the user to generate a modified search query. For example, control circuitry 404 may add keyword "tennis" (i.e., keyword 1 of Table 3) to the search query received from the user to generate a modified search query: "Call John gym tennis."

In some embodiments, steps 902-906 may be repeated any number of times to modify the search query based on multiple items ensembles present in the physical vicinity of the user.

Figure 10:
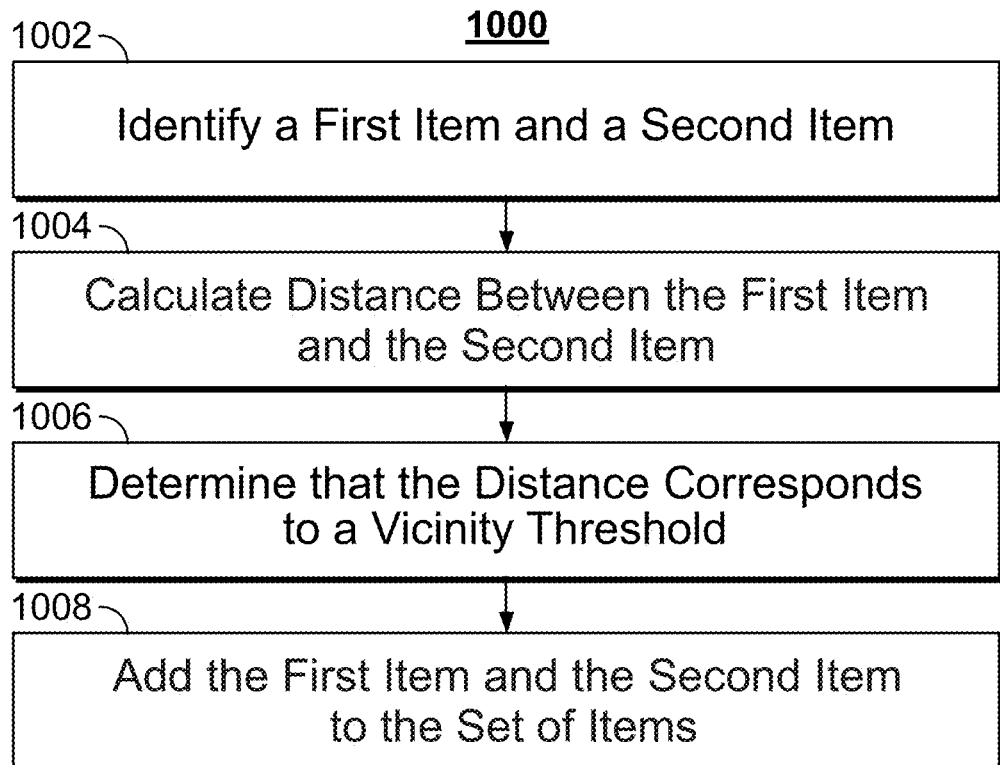
FIG. 10 depicts a flow diagram for a process of identifying a set of items, in accordance with some embodiments of the disclosure.

FIG. 10 depicts another illustrative flow diagram of a process 1000 for a process of disambiguating user input in accordance with an embodiment of the disclosure. Process 1000 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514. In some embodiments, process 1000 occurs as part of step 808 of FIG. 8.

Process 1000 begins at 1002, where control circuitry may identify a first item and a second item. For example, control circuitry 404 may identify jacket 111 and tie 112. As explained above, a first item and a second item may be identified via IoT network, via RFID scan, or via video signal processing.

Process 1000 continues at 1004, where control circuitry 404 may calculate the distance between the first item and the second item. For example, multiple RFID sensors can be used to triangulate locations of the first item and the second item. In another example, control circuitry 404 may determine the distance using visual signal processing.

Process 1000 continues at 1006, where control circuitry 404 may determine whether the distance corresponds to a vicinity threshold (e.g., 5 feet). In some embodiments, if the distance is below the threshold, control circuitry 404 may proceed to step 1008.

Process 1000 continues at 1008, where control circuitry 404 may, in response to determining that the distance corresponds to the vicinity threshold (e.g., less than a threshold), add the first item and the second item to the set of items (e.g., set of items determined at step 808). For example, if jacket 111 and tie 112 are three feet away, both may be added to the set of items. In some embodiments, control circuitry 404 may repeat steps 1002-1008 to identify any number of items to be added to the set of items.

Figure 11:
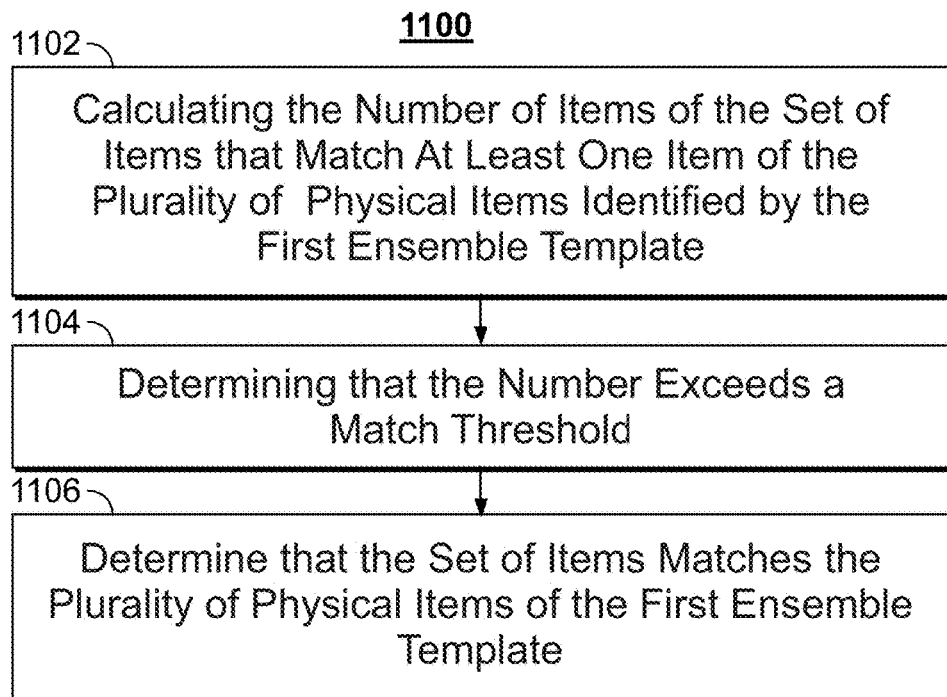
FIG. 11 depicts an illustrative flow diagram for a process of determining a match between a set of items and items of an ensemble template, in accordance with some embodiments of the disclosure.

FIG. 11 depicts another illustrative flow diagram of a process 1100 for a process of determining a match between a set of items and items of an ensemble template in accordance with an embodiment of the disclosure. Process 1100 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514. In some embodiments, process 1100 occurs as part of step 810 of FIG. 8.

Process 1100 begins at 1102, where control circuitry 404 may calculate the number of items of the set of items that match at least one item of the plurality of physical items identified by the first ensemble template. In one example, the set of items may include jacket 111, tie 112, and belt 113. In this example, control circuitry 404 may determine that each of these items matches at least one item identified by the first template (e.g., template defined by Table 1). In this example, control circuitry 404 may calculate the number to have the value of "3."

Process 1100 continues at 1104, where control circuitry 404 may determine that the number exceeds a match threshold. For example, the match threshold may be a value of "2." In one example, since the value of "3" is greater than "2," control circuitry 404 may proceed to step 1106.

Process 1100 continues at 1106, where control circuitry 404 may determine that the set of items matches the plurality of physical items of the first ensemble template. For example, control circuitry 404 may determine that since three items near the user match the at least two items identified by the first ensemble template, the match with the template is established and the template is relevant to the current environment of the user.

Figure 12:
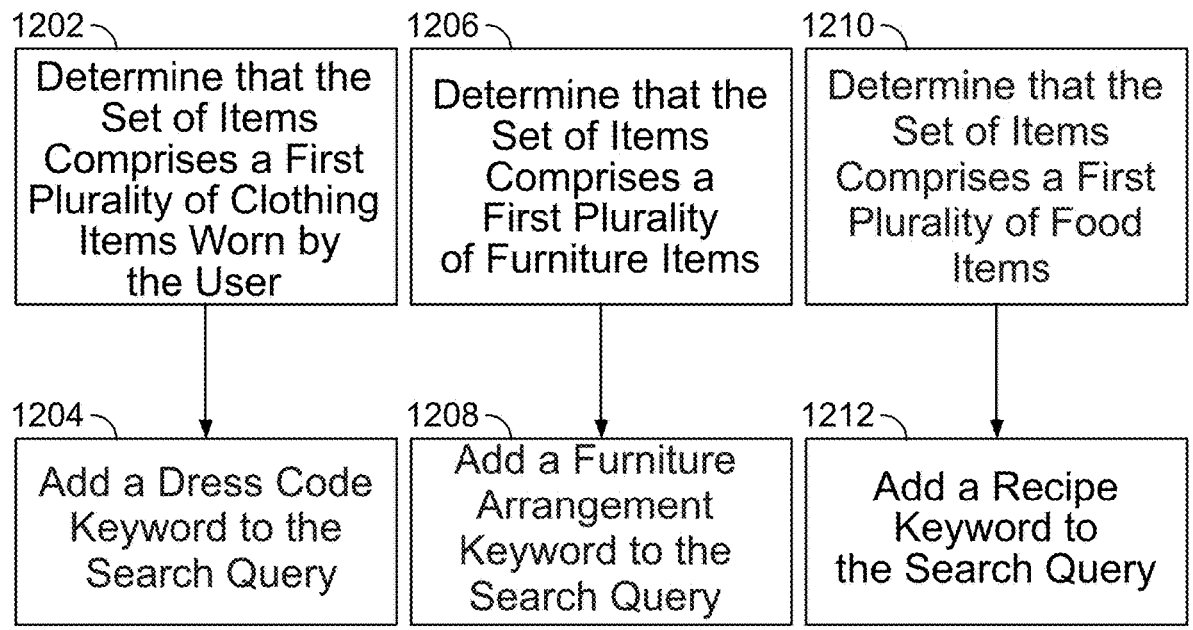
FIG. 12 depicts an illustrative flow diagram for a process of modifying the search query, in accordance with some embodiments of the disclosure.

FIG. 12 depicts a flow diagram of a process 1200 for modifying the search query in accordance with an embodiment of the disclosure. Process 1100 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514. In some embodiments, process 1200 occurs as part of step 812 of FIG. 8. In some embodiments, steps 1202-1204, 1206-1208, and 1210-1212 may be performed sequentially, simultaneously, optionally, or in any other order.

At 1202, control circuitry 404 may determine that the set of items comprises a first plurality of clothing items worn by the user. For example, control circuitry 404 may identify a work outfit, gym outfit, dancing outfit, snow-sports outfit, or any other type of an outfit.

In some embodiments, the first ensemble template may identify a second plurality of clothing items and a dress code keyword. For example, the first ensemble template may identify items needed for one of a work outfit, gym outfit, dancing outfit, snow-sports outfit, or any other type of an outfit. At 1204, control circuitry 404 may, in response to determining that the set of items matches the plurality of physical items identified by the first ensemble template of the list of ensemble templates, add the dress code keyword to the search query received from the user to generate the modified search query. For example, the control circuitry 404 may add keywords like "work" or "gym" to a search query like "call John" or "call a cab."

At 1206, control circuitry 404 may determine that the set of items comprises a first plurality of furniture items. For example, control circuitry 404 may identify furniture arranged for a party, furniture arranged for watching a movie, furniture arranged for dinner, or any other arrangement of furniture.

In some embodiments, the first ensemble template may identify a second plurality of furniture items and a furniture arrangement keyword. For example, the first ensemble template may identify items needed for one of furniture arranged for a party, furniture arranged for watching a movie, furniture arranged for dinner, or any other arrangement of furniture. At 1208, control circuitry 404 may, in response to determining that the set of items matches the plurality of physical items identified by the first ensemble template of the list of ensemble templates, add the furniture arrangement keyword to the search query received from the user to generate the modified search query. For example, the control circuitry 404 may add keywords like "party" or "dinner" to a search query like "play music." In this case, control circuitry 404 may play music based on the arrangement of furniture.

At 1210, control circuitry 404 may determine that the set of items comprises a first plurality of food items. For example, control circuitry 404 may identify food items for an omelet recipe, pancakes recipe, cake recipe, or any other recipe.

In some embodiments, the first ensemble template may identify a second plurality of food items and a recipe keyword. For example, the first ensemble template may identify food items for an omelet recipe, a pancakes recipe, cake recipe, or any other recipe. At 1212, control circuitry 404 may, in response to determining that the set of items matches the plurality of physical items identified by the first ensemble template of the list of ensemble templates, add the recipe keyword to the search query received from the user to generate the modified search query. For example, the control circuitry 404 may add keywords like "omelet" or "pancake" to a search query like "show me a recipe." In this case, control circuitry 404 may augment a request for a recipe based on the ensemble of food items in front of the user.

It is contemplated that the steps or descriptions of each of FIGS. 7-12 may be used with any other embodiment of this disclosure. It is contemplated that some steps or descriptions of each of FIGS. 7-12 may be optional and may be omitted in some embodiments. In addition, the steps and descriptions described in relation to FIGS. 7-12 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-5 could be used to perform one or more of the steps in FIGS. 7-12.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user television equipment 502, media content source 516, or media guidance data source 518.

The processes discussed above in FIGS. 7-12 are intended to be illustrative and not limiting. One skilled in the art would appreciate that the steps of the processes in FIGS. 7-12 discussed herein may be omitted, modified, combined, and/or rearranged, and any additional steps may be performed, without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method, comprising:
   receiving, from a user, a search query for a recipe;
   determining that the search query received from the user comprises a portion with multiple possible meanings;
   in response to determining that the search query comprises the portion with multiple possible meanings:
      identifying, using at least one sensor, a set of food ingredients in a physical vicinity of the user;
      determining whether the set of food ingredients matches a plurality of physical items identified by a first ensemble template of a list of ensemble templates;

in response to determining that the set of food ingredients matches the plurality of physical items identified by the first ensemble template:
modifying the search query to include a descriptive keyword associated with the first ensemble template; and
providing results for the modified search query.

2. The method of claim 1, further comprising:
in response to determining that the search query comprises the portion with multiple possible meanings:
determining whether the set of food ingredients matches a plurality of physical items identified by a second ensemble template of the list of ensemble templates; and
in response to determining that the set of food ingredients matches the plurality of physical items identified by the second ensemble template of the list of ensemble templates:
modifying the search query to include a descriptive keyword associated with the second ensemble template.

3. The method of claim 1, wherein identifying the set of food ingredients in the physical vicinity of the user comprises:
identifying a first food ingredient and a second food ingredient;
calculating a distance between the first food ingredient and the second food ingredient;
determining whether the distance corresponds to a vicinity threshold; and
in response to determining that the distance corresponds to the vicinity threshold, adding the first food ingredient and the second food ingredient to the set of food ingredients.

4. The method of claim 3, further comprising:
receiving a first radio frequency signature and a second radio frequency signature from radio frequency identification (RFID) tags of the first food ingredient and the second food ingredient; and
identifying the first food ingredient based on the first radio frequency signature and the second food ingredient based on the second radio frequency signature.

5. The method of claim 1, wherein the at least one sensor is one of: an Internet of Things sensor, a RFID sensor, a video camera, an infrared sensor, and a near-field communication sensor.

6. The method of claim 1, wherein determining whether the set of food ingredients matches the plurality of physical items identified by the first ensemble template comprises:
calculating a number of food ingredients of the set of food ingredients that match at least one item of the plurality of physical items identified by the first ensemble template; and
in response to determining that the number exceeds a match threshold, determining that the set of food ingredients matches the plurality of physical items of the first ensemble template.

7. The method of claim 1, further comprising accessing the list of ensemble templates, wherein each ensemble template identifies the plurality of physical items and the descriptive keyword.

8. A system, comprising:
input/output circuitry configured to:
receive, from a user, a search query for a recipe; and
control circuitry configured to:
determine that the search query received from the user comprises a portion with multiple possible meanings;
in response to determining that the search query comprises the portion with multiple possible meanings:
identify, using at least one sensor, a set of food ingredients in a physical vicinity of the user;
determine whether the set of food ingredients matches a plurality of physical items identified by a first ensemble template of a list of ensemble templates;
in response to determining that the set of food ingredients matches the plurality of physical items identified by the first ensemble template:
modify the search query to include a descriptive keyword associated with the first ensemble template; and
provide results for the modified search query.

9. The system of claim 8, wherein the control circuitry is further configured to:
in response to determining that the search query comprises the portion with multiple possible meanings:
determine whether the set of food ingredients matches a plurality of physical items identified by a second ensemble template of the list of ensemble templates; and
in response to determining that the set of food ingredients matches the plurality of physical items identified by the second ensemble template of the list of ensemble templates:
modify the search query to include a descriptive keyword associated with the second ensemble template.

10. The system of claim 8, wherein the control circuitry is configured to identify the set of food ingredients in the physical vicinity of the user by:
identifying a first food ingredient and a second food ingredient;
calculating a distance between the first food ingredient and the second food ingredient;
determining whether the distance corresponds to a vicinity threshold; and
in response to determining that the distance corresponds to the vicinity threshold, adding the first food ingredient and the second food ingredient to the set of food ingredients.

11. The system of claim 10, wherein the control circuitry is further configured to:
receive a first radio frequency signature and a second radio frequency signature from radio frequency identification (RFID) tags of the first food ingredient and the second food ingredient; and
identify the first food ingredient based on the first radio frequency signature and the second food ingredient based on the second radio frequency signature.

12. The system of claim 8, wherein the at least one sensor is one of: an Internet of Things sensor, a RFID sensor, a video camera, an infrared sensor, and a near-field communication sensor.

13. The system of claim 8, wherein the control circuitry determines whether the set of food ingredients matches the plurality of physical items identified by the first ensemble template by:
calculating a number of food ingredients of the set of food ingredients that match at least one item of the plurality of physical items identified by the first ensemble template; and in response to determining that the number exceeds a match threshold, determining that the set of food ingredients matches the plurality of physical items of the first ensemble template.

14. The system of claim 8, wherein the control circuitry is further configured to access the list of ensemble templates, wherein each ensemble template identifies the plurality of physical items and the descriptive keyword.

15. An apparatus, comprising:
- means for receiving, from a user, a search query for a recipe;
- means for determining that the search query received from the user comprises a portion with multiple possible meanings;
- means for, in response to determining that the search query comprises the portion with multiple possible meanings:
  - identifying, using at least one sensor, a set of food ingredients in a physical vicinity of the user;
  - determining whether the set of food ingredients matches a plurality of physical items identified by a first ensemble template of a list of ensemble templates;
  - means for, in response to determining that the set of food ingredients matches the plurality of physical items identified by the first ensemble template:
    - modifying the search query to include a descriptive keyword associated with the first ensemble template; and
    - providing results for the modified search query.

16. The apparatus of claim 15, further comprising:
means for, in response to determining that the search query comprises the portion with multiple possible meanings:
- determining whether the set of food ingredients matches a plurality of physical items identified by a second ensemble template of the list of ensemble templates; and
- means for, in response to determining that the set of food ingredients matches the plurality of physical items identified by the second ensemble template of the list of ensemble templates:
  - modifying the search query to include a descriptive keyword associated with the second ensemble template.

17. The apparatus of claim 15, wherein the means for identifying the set of food ingredients in the physical vicinity of the user comprises:
- means for identifying a first food ingredient and a second food ingredient;
- means for calculating a distance between the first food ingredient and the second food ingredient;
- means for determining whether the distance corresponds to a vicinity threshold; and
- means for, in response to determining that the distance corresponds to the vicinity threshold, adding the first food ingredient and the second food ingredient to the set of food ingredients.

18. The apparatus of claim 17, further comprising:
- means for receiving a first radio frequency signature and a second radio frequency signature from radio frequency identification (RFID) tags of the first food ingredient and the second food ingredient; and
- means for identifying the first food ingredient based on the first radio frequency signature and the second food ingredient based on the second radio frequency signature.

19. The apparatus of claim 15, wherein the at least one sensor is one of: an Internet of Things sensor, a RFID sensor, a video camera, an infrared sensor, and a near-field communication sensor.

20. The apparatus of claim 15, wherein the means for determining whether the set of food ingredients matches the plurality of physical items identified by the first ensemble template comprises:
- means for calculating a number of food ingredients of the set of food ingredients that match at least one item of the plurality of physical items identified by the first ensemble template; and
- means for, in response to determining that the number exceeds a match threshold, determining that the set of food ingredients matches the plurality of physical items of the first ensemble template.

* * * * *